US011119807B2

(12) United States Patent
Engelhart

(10) Patent No.: US 11,119,807 B2
(45) Date of Patent: Sep. 14, 2021

(54) DYNAMIC DISCOVERY MECHANISM IN 5G SYSTEMS AND METHODS

(71) Applicant: T-Mobile USA, Inc., Bellevue, WA (US)

(72) Inventor: Robert Engelhart, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 64 days.

(21) Appl. No.: 16/559,537

(22) Filed: Sep. 3, 2019

(65) Prior Publication Data

US 2021/0064406 A1 Mar. 4, 2021

(51) Int. Cl.
*H04L 29/12* (2006.01)
*G06F 9/455* (2018.01)
*H04L 29/06* (2006.01)

(52) U.S. Cl.
CPC ...... *G06F 9/45558* (2013.01); *H04L 61/1511* (2013.01); *H04L 65/1073* (2013.01); *G06F 2009/4557* (2013.01); *G06F 2009/45595* (2013.01)

(58) Field of Classification Search
CPC ............. H04L 41/0853; H04L 41/5058; H04L 43/0817; H04L 45/02; H04L 61/1511; H04L 65/1073; H04W 8/06; H04W 24/04; G06F 9/45558; G06F 2009/45595; G06F 2009/4557

See application file for complete search history.

(56) References Cited

U.S. PATENT DOCUMENTS

| 10,887,751 | B1* | 1/2021 | Cakulev | H04W 8/005 |
| 2019/0230556 | A1* | 7/2019 | Lee | H04W 60/00 |
| 2020/0127916 | A1* | 4/2020 | Krishan | H04L 47/125 |
| 2020/0145833 | A1* | 5/2020 | Thakolsri | H04W 48/18 |
| 2020/0177457 | A1* | 6/2020 | Seenappa | H04W 12/128 |
| 2020/0296606 | A1* | 9/2020 | Mendoza | H04W 24/04 |
| 2020/0396132 | A1* | 12/2020 | Wang | H04L 41/0853 |
| 2021/0028992 | A1* | 1/2021 | Chang | H04L 67/10 |

OTHER PUBLICATIONS

"Ultra Cloud Core 5G Session Management Function, Release Feb. 2020—Configuration and Administration Guide", Cisco, Feb. 2020.*
"3rd Generation Partnership Project; Technical Specification Group Services and System Aspects; System Architecture for the 5G System; Stage 2 (Release 15)". 3GPP TS 23.501 V15.4.0 (Dec. 2018), 236 pages.

* cited by examiner

*Primary Examiner* — Jungwon Chang
(74) *Attorney, Agent, or Firm* — Perkins Coie LLP

(57) ABSTRACT

Systems and methods for dynamically managing network functions (NFs) in a network such as 5G network are disclosed. The method includes instantiating a new NF associated with a target region; iteratively querying one or more network repository functions (NRFs) for lists of NFs associated with smaller regions based on a preceding response; and registering the new NF based on one or more responses to the iterative queries.

20 Claims, 5 Drawing Sheets

DYNAMIC DISCOVERY MECHANISM IN 5G SYSTEMS AND METHODS

BACKGROUND 5G is the Fifth-Generation cellular network technology that targets improvements over previous cellular network technologies, such as 4G Long Term Evolution (LTE). Compared to the previous technologies, the 5G systems and standards target lower latency based on changes to both physical transmission of signals (based on, e.g., communicating signals in higher frequency bands) and based on changes to network architecture. While standards (e.g., the Third Generation Partnership Project (3GPP) standards) govern some aspects of 5G network technology, many aspects of communication devices and systems, including implementation details, remain unaddressed.

Figure 1:
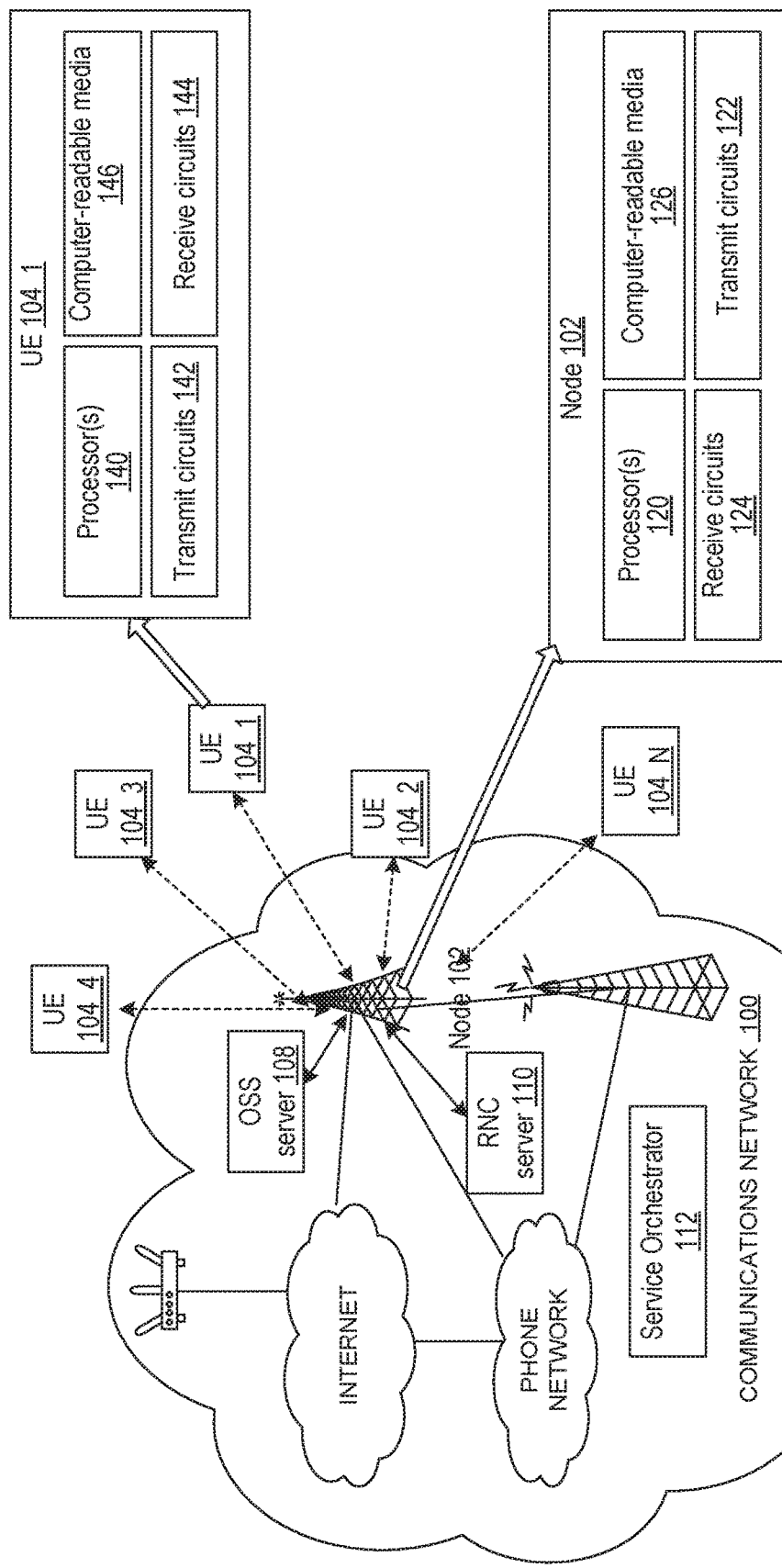
FIG. 1 illustrates a communication network in which some implementations of the present technology can be utilized.

In the drawings, some components and/or operations can be separated into different blocks or combined into a single block for discussion of some of the implementations of the present technology. Moreover, while the technology is amenable to various modifications and alternative forms, specific implementations have been shown by way of example in the drawings and are described in detail below. The intention, however, is not to limit the technology to the particular implementations described. On the contrary, the technology is intended to cover all modifications, equivalents, and alternatives falling within the scope of the technology as defined by the appended claims.

DETAILED DESCRIPTION

For 5G networks, various functionalities (e.g., security, dynamic resource allocations, address allocations, filtering, etc.) are provided via network functions (NFs). According to 3GPP standards, the NFs include standard-adopted or standard-defined processing functions in a network, which have defined functional behaviors and interfaces. The NFs can be implemented either as network elements on dedicated hardware, as software instances running on dedicated hardware, or as a virtualized functions instantiated on appropriate platforms (e.g., on a cloud infrastructure). Some examples of the NFs include Authentication Server Function (AUSF), Access and Mobility Management Function (AMF), User Equipment (UE), and Session Management Function (SMF).

Additionally, the NF can include a Network Repository Function (NRF) that supports service discovery function. The NRF can receive NF Discovery Requests from an NF instance and provide the information of the discovered or previously registered NF instances to the requesting NF instance. Further, the NRF can maintain the NF profile of available NF instances and their supported services. For some 5G networks, one or more NRFs can be implemented as regional NRFs that are each configured to manage the NF Discovery Requests for the corresponding geographic region. For example, the regional NRFs can manage the NF Discovery Requests from NFs associated with the corresponding geographic region and/or provide the information of the discovered NF instances within the corresponding geographic region. Accordingly, the regional NRFs can maintain the NF profile of available NF instances and their supported services for the corresponding geographic region.

In conventional systems and networks, the regional NRFs and their corresponding regions are predetermined by a human operator. In other words, the NRFs are static and do not deviate from their predetermined geographic regions and/or assigned functions. Accordingly, the initial network setup and any modifications to the network all require human operator intervention. Further, due to the static nature, conventional systems and networks often have insufficient resources to handle temporary high increases in network load (due to, e.g., a popular online event). For conventional networks that have sufficient resources to handle the temporary high demands, a large portion of the static resources remains under-utilized for a majority of the operations.

In one or more embodiments of the current technology, a communications network and system can provide dynamic discovery, registration, and/or management of 5G NFs. For example, NRFs and/or NFs can be configured to instantiate themselves and their category (e.g., global or regional) based on a predetermined process. Also, NRFs can be configured to instantiate themselves and their category by autonomously communicating with a previously created global NRF. Based on the instantiation and/or during the instantiation process, the NRFs can store their identifiers (e.g., Internet Protocol (IP) addresses), the corresponding regions, and/or other registration information at a global Domain Name System (DNS). Once instantiated, the NRFs can register new NFs. For instantiating new NFs, a communication component (e.g., the NF) can be configured to query the global DNS and receive a list of the global NRFs. The new NF can autonomously communicate with one of the global NRFs and the regional NRFs thereof for registration. Details of the instantiations and the registrations for the NRFs and the NFs are described below.

In the following description, for the purposes of explanation, numerous specific details are set forth in order to provide a thorough understanding of implementations of the present technology. It will be apparent, however, to one skilled in the art that implementations of the present technology can be practiced without some of these specific details. Further, while the following description discusses voice communication (e.g., VoLTE, VoNR, and so on), it will be apparent to one skilled in the art that implementations of the present technology can be practiced for other types of communications as well (e.g., video, text, and so on).

The techniques introduced here can be implemented as special-purpose hardware (e.g., circuitry), as programmable circuitry appropriately programmed with software and/or firmware, or as a combination of special-purpose and programmable circuitry. Hence, implementations can include a machine-readable medium having stored thereon instructions which can be used to program a computer (or other electronic devices) to perform a process. The machine-readable medium can include, but is not limited to, floppy diskettes, optical disks, compact disc read-only memories (CD-ROMs), magneto-optical disks, read-only memories (ROMs), random access memories (RAMs), erasable programmable read-only memories (EPROMs), electrically erasable programmable read-only memories (EEPROMs), magnetic or optical cards, flash memory, or other types of media/machine-readable medium suitable for storing electronic instructions.

The phrases "in some implementations," "according to some implementations," "in the implementations shown," "in other implementations," and the like generally mean the particular feature, structure, or characteristic following the phrase is included in at least one implementation of the present technology and can be included in more than one implementation. In addition, such phrases do not necessarily refer to the same implementations or different implementations.

FIG. 1 illustrates a communications network 100 (also referred to herein as network 100) in accordance with various implementations or embodiments. The network 100 can include a connection node 102 (e.g., a base station (BS)) communicatively coupled to one or more user equipment (UE), such as UEs 104_1-104_N, where N is an integer. The connection node 102 can serve UEs 104 located within a geographical area, for example, within a macro cell. The connection node 102 can be configured to connect the served UEs 104 to a larger network (e.g., a wired network). For example, the connection node 102 can communicate voice traffic and/or data traffic between the connected UEs 104 and the larger network. In some embodiments, the connection node 102 can include a Radio Access Network (RAN) Node such as an Evolved-Universal Terrestrial Radio Access Network (E-UTRAN) Node B (also commonly denoted an eNode B, or eNB) and/or RNC in an E-UTRAN. In some embodiments, the connection node 102 can include a next generation Node B (gNB).

The connection node 102 can communicate with the UEs 104 using one or more communication protocols or standards. Some examples of the communication protocols or standards can include: Global System for Mobile Communications (GSM), Internet Protocol (IP) Multimedia Subsystem (IMS), Time Division Multiple Access (TDMA), Universal Mobile Telecommunications System (UMTS), Evolution-Data Optimized (EVDO), Long Term Evolution (LTE), Generic Access Network (GAN), Unlicensed Mobile Access (UMA), Code Division Multiple Access (CDMA) protocols (e.g., IS-95, IS-2000, and IS-856 protocols), Advanced LTE or LTE+, Orthogonal Frequency Division Multiple Access (OFDM), General Packet Radio Service (GPRS), Enhanced Data GSM Environment (EDGE), Advanced Mobile Phone System (AMPS), WiMAX protocols (e.g., IEEE 802.16e-2005 and IEEE 802.16m protocols), any of the various IEEE 802.11 standards, High Speed Packet Access (HSPA), (including High Speed Downlink Packet Access (HSDPA) and High Speed Uplink Packet Access (HSUPA)), Ultra Mobile Broadband (UMB), 5G NR (New Radio), and/or other communications networks.

The connection node 102 can be communicatively coupled (e.g., using a backhaul connection) to backhaul equipment, for example, an operation support subsystem (OSS) server 108, a radio network controller (RNC) 110, etc. The RNC 110 can also be in the form of or include a mobility management entity (MME) and/or an access and management mobility function (AMF). The connection node 102 can further be communicatively coupled to other networks or components therein. For example, the connection node 102 can be communicatively coupled to components (e.g., servers, switches, etc.) of the Internet and/or the telephone network.

As shown in the block diagram, the connection node 102 can include one or more processors 120, one or more transmit circuits (transmitters) 122, one or more receive circuits (receivers) 124, and/or computer-readable media 126. The processors 120 can be configured to execute instructions, which can be stored in the computer-readable media 126 or in other computer-readable media accessible to the processors 120. The processors 120 can be a central processing unit (CPU), a graphics processing unit (GPU), or both CPU and GPU, or any other sort of processing unit.

The transmitters 122 can include circuitry (e.g., antennas, decoders, encoders, filters, amplifiers, etc.) configured to transmit signals (e.g., wireless signals) to external devices (e.g., the UEs 104). Conversely, the receivers 124 can include circuitry (e.g., antennas, detectors, decoders, encoders, filters, amplifiers, etc.) configured to receive signals from external devices. In some embodiments, the transmitters 122 and the receivers 124 can be combined (e.g., transceivers) into a larger or an overlapping circuitry.

The computer-readable media 126 includes computer-readable storage media (CRSM), which can include any available physical media accessible by a computing device to implement the instructions stored thereon. For example, CRSM can include, RAM, ROM, EEPROM, flash memory or other memory technology, optical disc storage, magnetic cassettes, magnetic tape, magnetic disk storage or other magnetic storage devices, or any other medium which can be used to store the desired information and which can be accessed by the processors 120. The computer-readable media 126 can reside within the connection node 102, on one or more storage devices accessible on a local network to the connection node 102, on cloud storage accessible via a wide area network to the connection node 102, or in any other location. The computer-readable media 126 can store modules, such as instructions, data stores, and so forth that are configured to execute on the processors 120.

The UEs 104 can include any devices for communicating over a wireless communication network. Such devices can include mobile telephones, cellular telephones, mobile computers, Personal Digital Assistants (PDAs), radio frequency devices, handheld computers, laptop computers, tablet computers, server computers, client computers, personal computers (PCs), tablet PCs, set-top boxes ("STBs"), palmtops, pagers, integrated devices combining one or more of the preceding devices, or any machine capable of executing a set of instructions (sequential or otherwise) that specify actions to be taken by that machine. As such, the UEs 104 can range widely in terms of capabilities and features. In some embodiments, the UEs 104 can include a universal integrated circuit card (UICC) with, for example, a subscriber identity module ("SIM")). The UEs 104 can alternatively or additionally include SIM-less devices (e.g., mobile devices that do not contain a functional SIM), embedded SIM devices (e.g., eSIM and/or iSIM devices), roaming mobile devices (e.g., mobile devices operating outside of their home access networks), and/or mobile software applications.

Similar to the connection node 102, the UEs 104 can include processors 140, one or more transmit circuits (transmitters) 142, one or more receive circuits (receivers) 144, and/or computer-readable media 146. The processors 140 can be configured to execute instructions, which are stored in the computer-readable media 146 or in other computer-readable media accessible to the processors 140. In some implementations, the processor 140 can be a central processing unit (CPU), a graphics processing unit (GPU), or both CPU and GPU, or any other sort of processing unit. The one or more transmitters 142 can include circuitry configured to transmit signals to an external device (e.g., the connection node 102 and/or another UE), and the one or more receivers 144 can include circuitry configured to receive signals from an external device (e.g., the connection node 102 and/or another UE). In some embodiments, the transmitters 142 and the receivers 144 can be a combined or an overlapping circuit (e.g., transceivers). The computer-readable media 146 can store several modules, such as instructions, data stores, and so forth that are configured to execute on the processors 140. Although not illustrated in FIG. 1, the UEs 104 can also include various other components, for example, a battery, a charging unit, one or more network interfaces, an audio interface, a display, a keypad or keyboard, a GPS receiver and/or other location determination component, and other input and/or output interfaces.

The network 100 can further include one or more virtualized nodes that are implemented by one or more circuit components. In some embodiments, the virtualized nodes can be implemented via a distributed computing environment and/or a cloud-computing environment. Some examples of the virtualized nodes for the network 100 can include Network Functions (NFs), which are described in further detail below, and service orchestrators 112. The service orchestrators 112 can be configured to track the network load and/or loads of the NFs. In other words, the service orchestrators 112 can monitor and/or predict a number of tasks assigned to and/or performed by one or more of the NFs in the network 100. In some embodiments, the service orchestrators 112 can be configured to predict a demand for the NFs. As described in further detail below, the network 100 can use the load/demand (via, e.g., the service orchestrators 112, other components, and/or other virtualized node) to dynamically build and populate additional NFs and/or other types of virtualized nodes instead of relying on statically defined/limited functions and location assignments.

In general, the network 100 can include multiple cells, with each cell including one or more BSs (macro cell), 5G transceivers (e.g., small cell devices or access points), or a combination of both macro and small cells (HetNets), though many other cell types are possible including cells having one or more femtocells, picocells, IEEE 802.11 access points (WiFi APs), and the like. Depending on the configuration and size, the network 100 can represent and serve various regional areas, for example, one or more rooms, one or more blocks, a city, a state, an entire nation, the whole world, etc.

Figure 2:
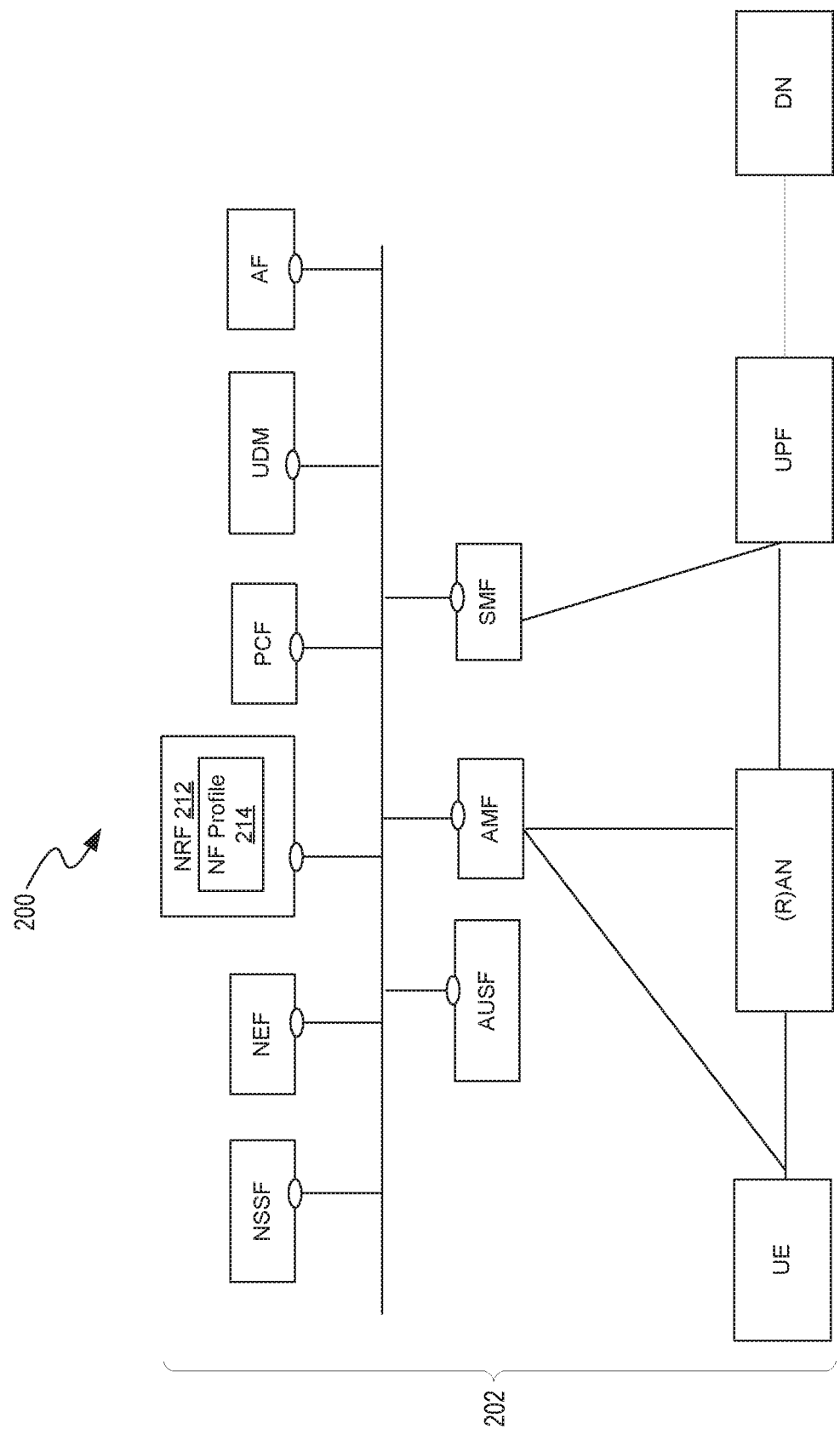
FIG. 2 illustrates an example 5G system architecture in accordance with one or more embodiments of the present technology.

FIG. 2 illustrates an example 5G system architecture 200 (system architecture 200) in accordance with one or more embodiments of the present technology. The system architecture 200 can represent the network 100 of FIG. 1 or a portion thereof. The system architecture 200 can include various NFs 202 that implement the 5G communications network for a service-based architecture. The NFs 202 can include virtualized nodes that are software-based, and in some embodiments, can be implemented on cloud computing platforms.

For the system architecture 200, the UEs 104 of FIG. 1 can be represented as instances of the NFs 202. Once the UEs 104 connect to the network 100, the UEs 104 can interact/communicate with other NFs 202. As illustrated in FIG. 2, for example, the NFs 202 can include a Network Slice Selection Function (NSSF), a Network Exposure Function (NEF), a Policy Control Function (PCF), a Unified Data Management (UDM), an Application Function (AF), an Authentication Server Function (AUSF), an Access and Mobility Management Function (AMF), a Session Management Function (SMF), a (Radio) Access Network ((R)AN), a User Plane Function (UPF), and/or a Data Network (DN). Different types of the NFs 202 can be configured to perform one or more functionalities for communicating data between two or more end points (e.g., to and/or from the UEs 104). For example, the NSSF can be configured to select a set of resources (e.g., Network Slice instances and/or the AMF) serving the UE. Also, for example, the AF can interact with the 3GPP Core Network for providing services associated with traffic routing and/or NEF access.

The NFs 202 can further include one or more Network Repository Functions (NRFs) 212. The NRFs 212 can each be configured to support service discovery. For example, the NRFs 212 can be configured to receive discover requests from NF instances and provide information of discovered NF instances to the requesting NF instances. Also, the NRFs 212 can maintain one or more NF profiles 214 for the available/discoverable NF instances and their supported services. In some embodiments, for example, the NF profiles 214 can include an identifier, a type, a network address, a capacity, a priority rating, an authorization data, an associated geographic region, or a combination thereof for the NFs 202 (including lower tier NRFs) that are available/discoverable to the corresponding NRFs 212. In some embodiments, the NF profiles 214 can correspond to a list of the NFs 202 that are available/discoverable to the corresponding NRFs 212.

For the sake of brevity, only a small set of the NFs 202 have been described in detail. However, one of ordinary skill in the art will appreciate that the other functions each perform functionalities for communicating data as described in the 3GPP standards regarding 5G system architectures. Also, for brevity, FIG. 1 illustrates a small set of the NFs 202. However, it is understood that the NFs 202 can include other types of functionalities, such as Charging Functions (CHFs).

Figure 3:
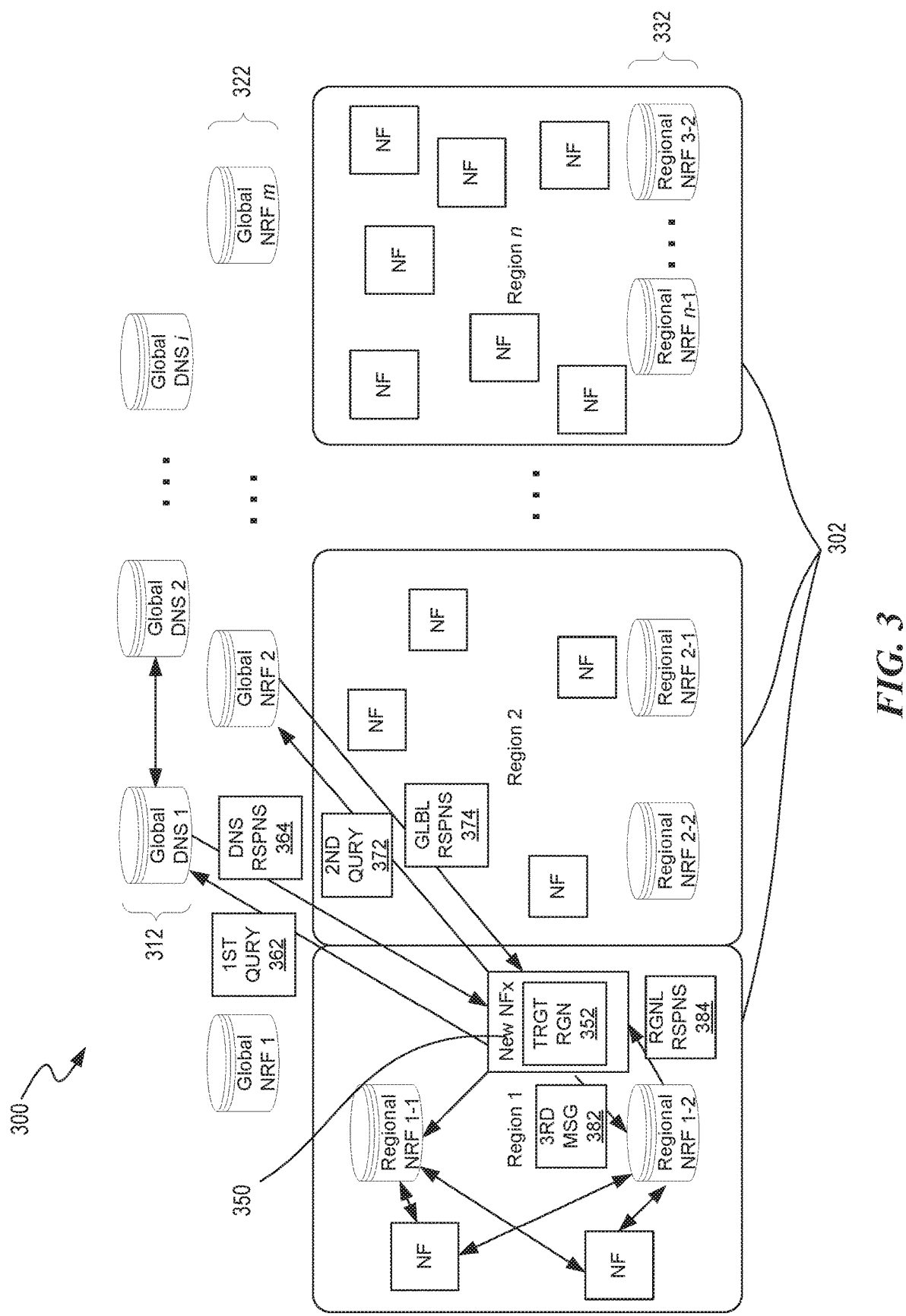
FIG. 3 illustrates an example network function architecture in accordance with one or more embodiments of the present technology.

FIG. 3 illustrates an example NF architecture 300 in accordance with one or more embodiments of the present technology. The NF architecture 300 can represent allocations of the NFs 202 of FIG. 2 with respect to geographic regions 302, such as rooms, buildings, city blocks, cities, states, countries, and/or any other physical areas. For example, the network 100 of FIG. 1 can include one or more NFs 202 that are related/assigned to the geographic regions 302. Also, the NF architecture 300 can include the NFs 202 that are executed by or are associated with devices (e.g., the UEs 104 of FIG. 1) and/or components located in the geographic regions 302.

The NF architecture 300 can include a set of devices, functions, services, or a combination thereof that are configured to track and manage the NFs 202 with respect to the geographic regions 302. In some embodiments, the network 100 can include one or more global DNSs 312, one or more global NRFs 322, and/or one or more regional NRFs 332. The NF architecture 300 can include the global DNSs 312, the global NRFs 322, and the regional NRFs 332 arranged according to hierarchical relationships. For example, the global DNSs 312 can be configured to track and manage higher tier instances of the NRFs 212, such as the global NRFs 322. The global NRFs 322 can be configured to track and manage the NRFs 212 that correspond to the geographic regions 302, such as the regional NRFs 332. Each of the regional NRFs 332 can be configured to track and manage the NFs 202 associated with the corresponding geographic region 302. In other words, each of the geographic regions 302 can have (1) one or more NFs 202 that are associated with the corresponding region, and/or (2) one or more regional NRFs 332 that track and manage the NFs for the corresponding region.

In one or more embodiments, the NRFs 212 can include and maintain the NF profiles 214 of FIG. 2 that include various descriptions of the tracked NFs 202 as described above. Similarly, the global DNSs 312 can include and maintain profiles that include various descriptions of the global NRFs 322.

The NF architecture 300 can autonomously instantiate (such as by generating, establishing, and/or initiating NFs) and populate the NFs 202, including the NRFs 212. In some embodiments, the NFs 202 can be configured to communicate with one or more entities (e.g., the DNSs and/or the NRFs 212) according to the NF architecture 300. In one or more embodiments, the NFs 202 can iteratively communicate with the entities that are successively associated with the smaller geographic coverages.

As an illustrative example, the network 100 can instantiate a new NF 350 to address a need and/or to provide functionality, such as when a new UE requests to connect to the network 100 and/or when triggered by the service orchestrators 112 of FIG. 1. The new NF 350 can be associated with a target region 352 (e.g., one of the geographic regions 302, such as region 1 as illustrated in FIG. 3) according to the need and/or the functionality (e.g., the NF type). To instantiate according to the associated geographic region, the new NF 350 can register with one or more NFs associated with the target region 352. When the new NF 350 is instantiated, the new NF 350 can communicate with a predetermined instance of the global DNS 312 (according to, e.g., a predetermined IP address). The new NF 350 can send a query message to a higher network node/entity for requesting identifiers and/or addresses (e.g., IP addresses) for the next tier. In some embodiments, the new NF 350 can send the target region 352 and/or the targeted function type with the query, and the responding entity can provide a response (e.g., a DNS response 364, a global response 374, and/or a regional response 384) regarding the lower tier entity that matches the target region 352. The new NF 350 can use the received information to communicate with the next tier entity. The new NF 350 can iteratively repeat the above-described process to register with the entity that directly manages the target region 352 (e.g., one or more of the regional NRFs 332).

As an illustrative example, the new NF 350 can send a first query message 362 to the global DNS 312 to identify the global NRFs 322 of the network 100. The global DNS 312 can reply with a DNS response 364 that includes information regarding the global NRFs 322. The new NF 350 can use the DNS response 364 to identify/select one of the global NRFs 322. The new NF 350 can send a second query message 372 to the selected global NRFs 322 to identify one or more of the regional NRFs 332 (e.g., for the target region 352). The corresponding global NRF can reply with a global response 374 that includes information regarding the regional NRFs 332 associated with the target region 352. The new NF 350 can use the global response 374 to select and send to one or more of the regional NRFs 332 a third message 382 to register itself and/or identify other NRFs and/or other NFs associated with the target region 352. In some embodiments, existing/registered NFs can use the queries and/or the corresponding responses described above to obtain information regarding NFs associated with the target region 352.

In some embodiments, the new NF 350 can register as a different type/entity and/or for a different location based on the current demand of the network 100. For such dynamic management, each of the entities (e.g., the DNSs and/or the NRFs) in the NF architecture 300 can include management profiles that further identify targeted conditions and current conditions for the managed entities. For example, the NFs 202 (e.g., the NRFs 212) can have a targeted number and/or a current number of the global NRFs 322 for all of the geographic regions 302 and/or for a set thereof. Also, for example, the NFs 202 (e.g., the NRFs 212) can have a targeted number and/or a current number of the regional NRFs 332 for each of the geographic regions 302. When the targeted conditions and the current conditions match one or more predetermined triggers, the new NF 350 can register as a type/entity and/or for a location that satisfies the targeted condition. For example, the new NF 350, regardless of the intended type thereof, can register as a global NRF with the global DNSs 312 when no global NRFs exist and/or when the demand for a new global NRF exceeds other demands according to the predetermined triggers. Similarly, the new NF 350 can register as a regional NRF with the global NRFs 322 when the demand for a new regional NRF for a region exceeds other demands. Since the original triggering condition/need for the new NF 350 would not be satisfied, the network 100 can instantiate another NF to satisfy such condition/need when next resources become available.

Figure 4:
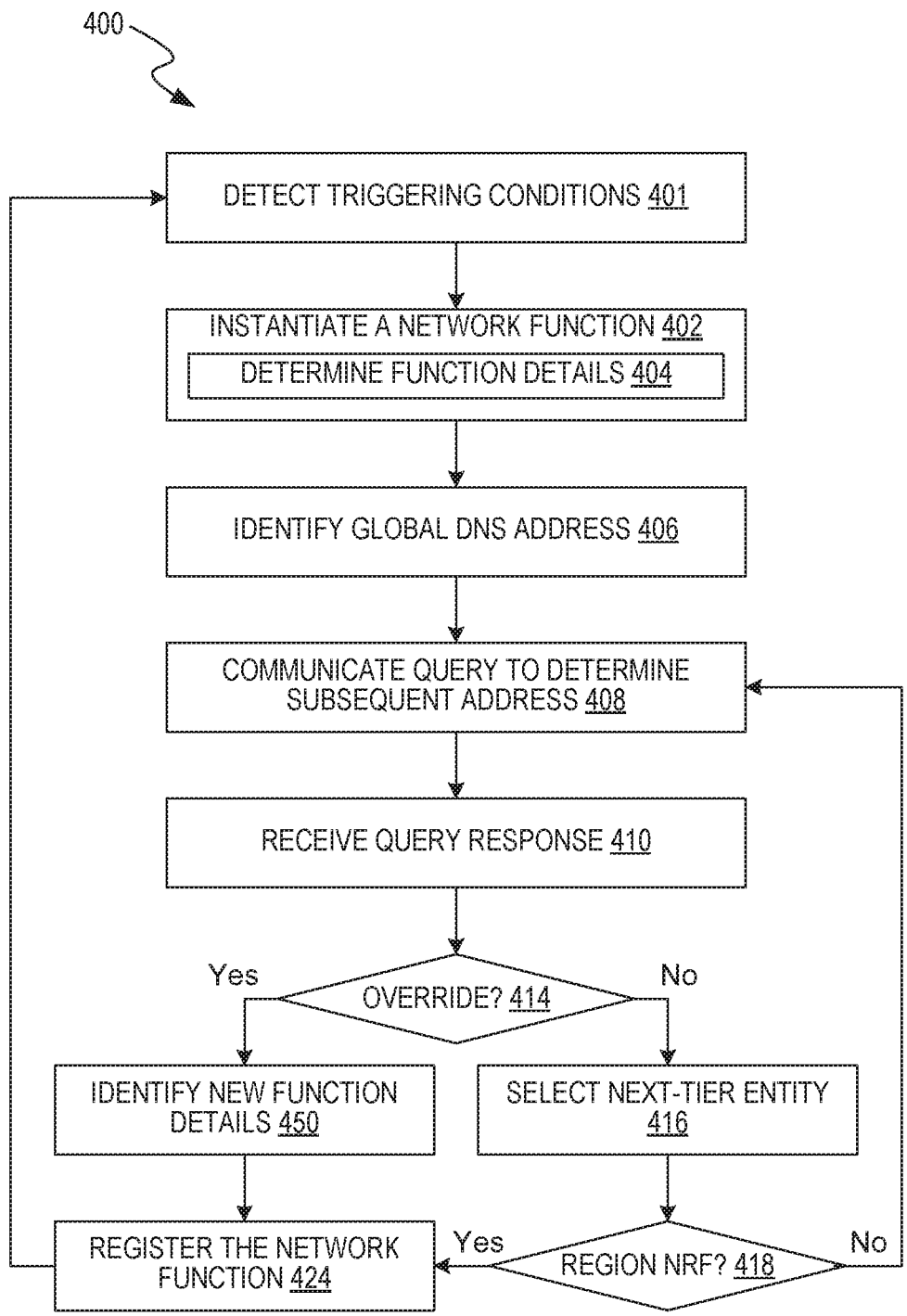
FIG. 4 is a flow diagram illustrating an example method for autonomously discovering and registering network functions in accordance with one or more embodiments of the present technology.

FIG. 4 is a flow diagram illustrating an example method 400 for autonomously discovering and registering network functions (e.g., the NFs 202 of FIG. 2) in accordance with one or more embodiments of the present technology. The method 400 can be for operating the network 100 of FIG. 1, the system architecture 200 of FIG. 2, the NF architecture 300 of FIG. 3, a portion thereof, or a combination thereof. The method 400 can be for dynamically and/or autonomously discovering and registering NFs (e.g., the NFs 202 of FIG. 2) in a telecommunications environment such as a 5G network.

At block 401, the network 100 can detect (via, e.g., one or more components therein, such as the service orchestrator 112 of FIG. 1) triggering conditions for instantiating an NF. In some embodiments, the service orchestrator 112 can include a predetermined target and/or limit conditions for instantiating new NFs. The service orchestrator 112 can track current conditions, compare the current conditions to the target/limit conditions, and instantiate the new NFs accordingly. For example, the service orchestrator 112 can track the current load (e.g., a number of the NFs according to a type and/or a region, a number of tasks for one or more of the NFs, etc.) of the existing NFs 202 and compare the tracked load to the predetermined capacity. When the load/demand or a projection thereof exceeds the capacity, the monitoring node can send a message and/or trigger an operation to instantiate new NFs.

At block 402, the network 100 can instantiate a new NF (e.g., the new NF 350 of FIG. 3) based on detecting the triggering conditions. For example, the network 100 can instantiate (via, e.g., the monitoring node and/or another administrative node) the new NF based on initiating a process, scheduling computing resources (e.g., processing time and/or circuitry), executing a function or a routing, or a combination thereof according to a predetermined mechanism.

At block 404, the network 100 can determine function details for the new NF 350. The network 100 can determine (via, e.g., the service orchestrators and/or one or more of the NFs 202) the functionality details of the new NF 350 according to the triggering condition. For example, the network 100 can access a predetermined template and/or predetermined instructions that describe the type, the target location, the address, etc. for the NF configured to address the triggering condition. Accordingly, the network 100 can communicate the information to the new NF 350. In some embodiments, the new NF 350 can access a list or receive control information that identifies the functionality details (e.g., the NF profile 214) corresponding thereto.

At block 406, the network 100 can identify a global DNS address. In some embodiments, the network 100 can be configured to instantiate the new NF 350 based on one or more predetermined access addresses (e.g., IP addresses) for a highest tier or root entity (e.g., one of the global DNSs 312 of FIG. 3). Accordingly, the new NF 350 can identify the predetermine access address as the global DNS address for the registration process.

At block 408, the network 100 can communicate one or more queries to determine a subsequent address. The one or more query messages can be configured to obtain addresses and/or identifiers for entities on the subsequent level. For example, the new NF 350 can initially send the first query message 362 of FIG. 3 according to a predetermined global DNS address for addresses and/or identifiers for the global NRFs 322. In some embodiments, the new NF 350 can provide the target region 352 of FIG. 3 and/or an intended NF type thereof along with or included in the query.

The corresponding entity can receive and process the query from the new NF 350. For example, the DNS can access and provide the DNS response 364 of FIG. 3 (e.g., a list of the global NRFs 322) in response to the first query message 362. At block 410, the new NF 350 can receive the response (e.g., the DNS response 364) to the query.

At block 414, the new NF 350 can process the received response and determine whether to override and register as a different type than the initially targeted functionality. In some embodiments, the new NF 350 can be configured to compare the current conditions (e.g., number and/or geographic assignments of the NRFs 212) identified in the received query response to one or more predetermined target conditions. When the current conditions do not satisfy the target conditions (e.g., insufficient number of NRFs 212 globally and/or regionally), such as illustrated at block 450, the new NF 350 can override the initially targeted function/region and register differently for satisfying the target conditions. For example, the new NF 350 can register as a global NRF or a regional NRF instead of the originally targeted functionality when the network 100 does not have at least a predetermined number of the global NRFs 322 and/or the regional NRFs 332 for one or more regions, respectively. Accordingly, based on the identified need, the new NF 350 can identify the new function details as illustrated at block 450.

At block 424, the new NF 350 can dynamically register as the updated entity/functionality. For example, the new NF 350 can communicate data and/or confirmations according to a predetermined process/protocol to register as an updated entity/functionality. The new NF 350 can communicate data according to the new function details with the DNS to register as a global NRF. Also, the new NF 350 can communicate data according to the new function details with one or more of the global NRFs 322 to register as a regional NRF. In some embodiments, the new NF 350 can communicate with the managing entity to obtain information regarding other NFs, such as other global NRFs and/or other regional NRFs. The new NF 350 can further obtain information regarding the geographic regions 302 and/or the NFs 202 associated with one or more of the geographic regions 302. The new NF 350 can include and/or operate according to predetermined rules, instructions, thresholds, etc. for comparing the real-time conditions with target conditions and initiating the override.

As an illustrative example, a condition local to region 1 (e.g., the target region 352) can trigger instantiation of a new regional NRF (block 401). As described above, the network 100 can instantiate a new NF with the function details for the new regional NRF (blocks 402 and 404), and the new NF can identify the predetermined IP address for one of the global DNSs 312 (block 406) and communicate a query message accordingly (block 408). When the global DNS responds to the query (block 410), the new NF can determine whether the current number of global NRFs 322 and/or the current load thereon satisfies predetermined target conditions/thresholds (block 410).

When the current conditions do not satisfy the targeted conditions, the new NF can trigger an override (block 414) to fill a global need/demand instead of the local demand/trigger that instantiated the new NF 350. Accordingly, the global DNS can identify the new function details as that of a global NRF for the new NF 350 (block 450) and the new NF 350 can register as a global NRF instead of the regional NRF (block 424). The new NF 350 can similarly register as a regional NRF for a different region when such region has a greater need (e.g., greater discrepancy between the current and targeted conditions) than the target region 352. Since the original need for the regional NRF would remain for the target region 352 due to the override, the network 100 can trigger another instantiation for a regional NRF for the target region 352 when resources become available.

In some embodiments, the network 100 can be configured to estimate a distance between the target region 352 of the new NF 350 and the region associated with the override condition when considering override of the intended registration. For example, the network 100 can be configured to determine the override when the target region 352 and the region with a greater need for the regional NRF are within a maximum threshold distance. Also, in some embodiments, the network 100 can be configured to ignore the target region 352 when overriding to register global NRFs. In some embodiments, the network 100 can include one or an initial set of the global NRFs 322 that are predetermined by human operators. The network 100 can register a remaining number of the targeted global NRFs 322 via the method 400 described above.

The method 400, as described above, can autonomously discover and register the NFs 202 for the 5G network (e.g., the network 100), thereby reducing/eliminating human labor in establishing and maintaining the network 100. Further, the method 400 can dynamically meet real-time demands, such as by registering the different types of NRFs, without requiring human operator input. Accordingly, the network 100 can meet the real-time demands with reduced lag/setup time and further reduce/eliminate operator inconsistencies and errors that can disable portions or features of the network 100.

Based on registering the new NF 350 as a different entity (e.g., an NRF and/or for a different region) than originally intended, the network 100 can dynamically and/or autonomously populate nodes according to real-time demands. Accordingly, the method 400 can reduce/eliminate human labor in establishing and maintaining the network 100. In some embodiments, the network 100 can include a set of statically instantiated or previously instantiated NFs (e.g., the NRFs 202). Based on the method 400, the network 100 can dynamically add global/regional NRFs to meet increased network demands.

When the current conditions satisfy the target conditions (i.e., no override is necessary), such as illustrated at block 416, the new NF 350 can select a next-tier entity. In some embodiments, the new NF 350 can identify an address/identifier for an entity associated with the target region 352 based on processing the received query response. For example, the new NF 350 can determine the address or the identifier for the global NRF and/or the regional NRF associated with the target region 352 based on the received response. The new NF 350 can use the determined address/identifier to send a subsequent query (e.g., the second query message 372 of FIG. 3).

At block 418, the new NF 350 can determine whether the next-tier entity (e.g., as described in the received query response) is a regional NRF (e.g., a lowest managing-tier entity). For example, the new NF 350 can determine whether the next-tier entity is a regional NRF based on a pattern or a format for the received information. Also, the new NF 350 can determine whether the next-tier entity is a regional NRF based on tracking a number of the queries and/or responses. When the next entity to be queried is above the regional NRFs 332 (e.g., the global NRF), the new NF 350 can select the appropriate entity (e.g., according to the target region 352) based on the received response. As illustrated by the feedback loop to block 408, the new NF 350 can use the corresponding identifier/address to communicate a query to the selected entity (e.g., one of the global or regional NRFs) and repeat the above-described processes until the next entity for the upcoming query is a regional NRF.

As an illustrative example, the new NF 350 can receive the addresses and/or identifiers for the global NRF 322 from the global DNS 312 (via, e.g., the DNS response 364 in response to the first query message 362). The new NF 350 can use the received information to select one of the global NRFs 322 and send the second query message 372 to thereto. The global NRF 322 can respond to the query by sending to the new NF 350 the address and/or the identifier (via, e.g., the global response 374) for the geographic region 302 and/or the regional NRFs 332 of the new NF 350. In some embodiments, the global NRF 322 can provide priorities or a sequence for the regional NRFs 332 supporting the target region 352.

When the next entity is one of the regional NRFs 332, such as illustrated at block 424, the network 100 can register the new NF 350 for the target region 352. Based on the global response 374, the new NF 350 can identify the regional NRFs 332 that correspond to the target region 352. In some embodiments, the new NF 350 can communicate with the regional NRFs 332 for the target region 352 according to the priorities/sequence until one of the regional NRFs 332 respond with a message for registering the new NF 350.

Upon establishing a connection between the new NF 350 and one or more of the regional NRFs 332, the network 100 can register (via, e.g., the third message 382). The registration process can include one or more of the regional NRFs 332 storing the information (e.g., the identifier, the functionality, the type, etc.) from the new NF 350 in one or more of the NF profiles 214 of FIG. 2, communicating confirmation to the new NF 350, and/or performing other actions according to predetermined registration processes and/or protocols. Also, the regional NRF 332 can communicate information regarding the other NFs associated with the target region 352 to the new NF 350 (via, e.g., the regional response 384). The new NF 350 can store and utilize the received information during implementation of the targeted functionalities. Once the new NF 350 is registered, the process can repeat (as illustrated by the feedback loop to block 401) when the network 100 detects the triggering conditions for another NF.

In some embodiments, the network 100 can use portions of the method 400 to gather information regarding the NFs 202 registered for the target region 352. For example, at block 401, an existing/registered virtualized node (e.g., one of the NFs 202) can detect triggering conditions, such as a predetermined timing or a real-time network condition, for gathering information (e.g., usage information) from or about the NFs 202 of the target region 352. For such information-gathering process, the network 100 can bypass the operations corresponding to blocks 402 and 404. Accordingly, the NF can follow the operations described above for blocks 406, 408, 410, 414, 416, and 418 to identify the regional NRFs 332 associated with the target region 352. The NF can communicate with the regional NRFs 332 to obtain the information regarding the NFs 202 associated with the target region 352. Since the requesting NF is already registered and requesting the information as part of its operation, the NF can bypass the operations corresponding to the registration aspect of block 424 and only request the information regarding the other NFs.

Figure 5:
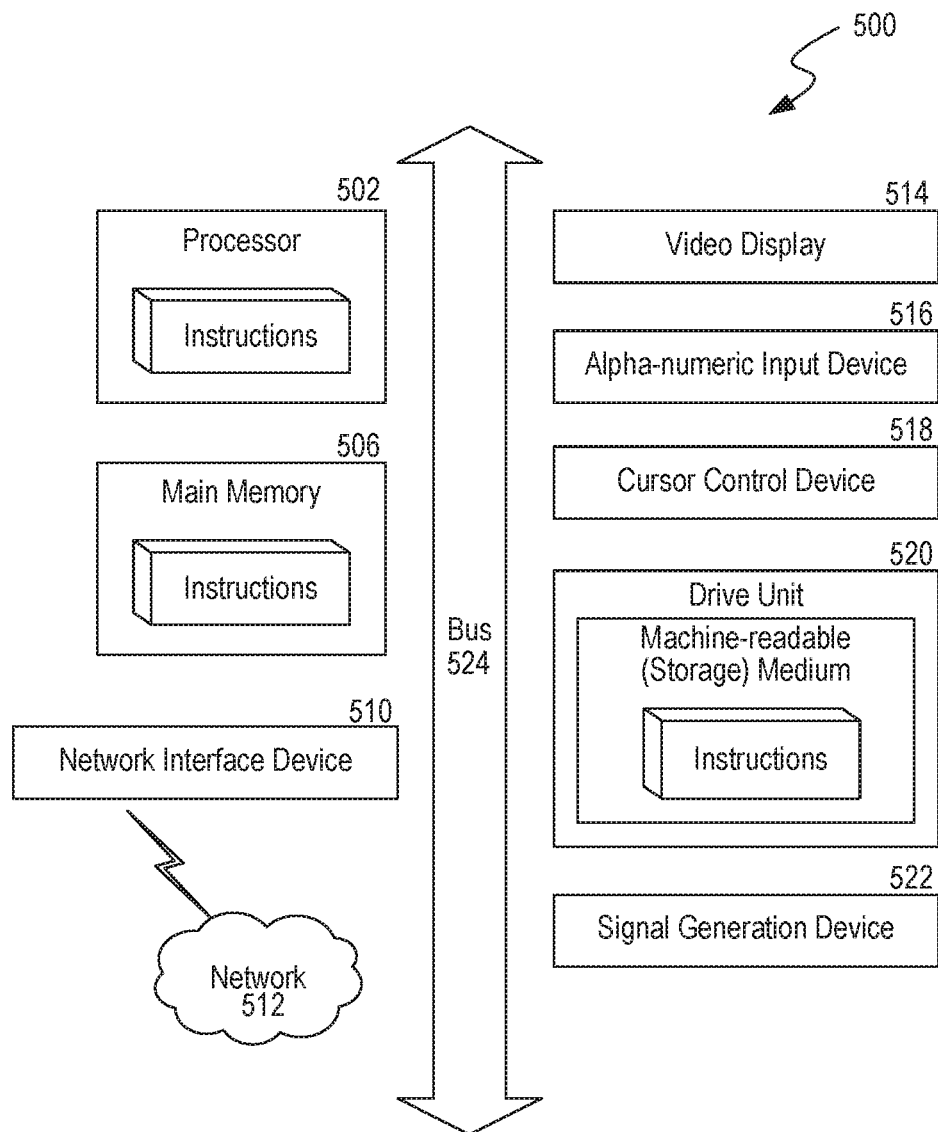
FIG. 5 is a diagrammatic representation of a machine in the example form of a computer system within which a set of instructions, for causing the machine to perform any one or more of the methodologies discussed herein, can be executed.

FIG. 5 is a diagrammatic representation of a machine in the example form of a computer system or machine 500 within which a set of instructions, when executed, can cause the machine to perform any one or more of the processes (e.g., method 400) described above. In some embodiments, the machine 500 operates as a standalone device, while in other embodiments, the machine 500 can be connected (e.g., networked) to other machines. In a networked deployment, the machine 500 can operate in the capacity of a server or a client user machine in a client-server network environment, or as a peer machine in a peer-to-peer (or distributed) network environment. The machine can include a user device, such as UEs 104 discussed above, the gNB, and/or other network components (e.g., cloud computing devices and/or servers). In some implementations, the machine 500 includes 5G servers. While a single machine is illustrated, the machine 500 can include any collection of machines that individually or jointly execute instructions to perform any of the methods described above.

The machine 500 can include a processor 502, a main memory 506 and a bus 524. The bus 524 can include a subsystem for transferring data between the components of the machine 500, including transferring data between the main memory 506 and the processor 502. The bus 524 can represent one or more separate physical buses, point to point connections, or both, connected by appropriate bridges, adapters, or controllers. The machine 500 can also include a display device 514, one or more input devices 516, a cursor control device 518 (e.g., a mouse), a drive unit 520, a signal generation device or output device 522 (e.g., a speaker, a remote control, etc.) and a network interface device 510, among others.

The processor(s) 502 can control the overall operation of the machine 500. The processor(s) 502 can execute computer programs or firmware stored in memory (for example, 506, 520). The processor(s) 502 can include one or more programmable general-purpose or special-purpose microprocessors, digital signal processors ("DSPs"), programmable controllers, application specific integrated circuits ("ASICs"), programmable logic devices ("PLDs"), trusted platform modules ("TPMs"), or the like, or a combination thereof.

The main memory 506 represents any form of memory (e.g., RAM, ROM, flash memory, or the like) or a combination of such devices connected to the bus 524. The drive unit 520 can include a machine-readable medium or machine-readable storage medium (such as computer-readable media 126) that stores, encodes or carries one or more sets of instructions for execution by the machine 500 to perform any or all of the methods described above. It should be noted that the term "machine-readable medium" and "machine-readable storage medium" can include a single medium or multiple media (e.g., a centralized or distributed database, and/or associated caches and servers) that store the one or more sets of instructions embodying any or all of the methods described above.

In general, the routines executed to implement the embodiments of the disclosure can be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

The network interface device 510 allows the machine 500 to mediate data in various networks with one or more entities that are external to the machine, through any known and/or convenient communications standards and protocols supported by the machine 500 and the external entities. Example protocols supported by the machine 500 include, but are not limited to: IP protocols for the application layer, transport layer protocols, Internet layer protocols, link layer protocols, LTE protocols, 3G/4G/5G protocols, etc. The network interface device 510 can include one or more of a network adaptor card, a wireless network interface card, a router, an access point, a wireless router, a switch, a multi-layer switch, a protocol converter, a gateway, a bridge, a bridge router, a hub, a digital media receiver, a repeater, or other interfaces for supporting the various protocols. Although the present disclosure describes the components and functions implemented in the embodiments with reference to particular standards and protocols that represent examples of the state of the art, the disclosure is not limited to such standards and protocols, and includes functional equivalents that can supersede the current state of the art.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of implementations of the system is not intended to be exhaustive or to limit the system to the precise form disclosed above. While specific implementations of, and examples for, the system are described above for illustrative purposes, various equivalent modifications are possible within the scope of the system, as those skilled in the relevant art will recognize. For example, some network elements are described herein as performing certain functions. Those functions could be performed by other elements in the same or differing networks, which could reduce the number of network elements. Alternatively, or additionally, network elements performing those functions could be replaced by two or more elements to perform portions of those functions. In addition, while processes, message/data flows, or blocks are presented in a given order, alternative implementations may perform routines having blocks, or employ systems having blocks, in a different order, and some processes or blocks may be deleted, moved, added, subdivided, combined, and/or modified to provide alternative or subcombinations. Each of these processes, message/data flows, or blocks may be implemented in a variety of different ways. Also, while processes or blocks are at times shown as being performed in series, these processes or blocks may instead be performed in parallel, or may be performed at different times. Further, any specific numbers noted herein are only examples; alternative implementations may employ differing values or ranges.

The teachings of the methods and system provided herein can be applied to other systems, not necessarily the system described above. The elements, blocks, and acts of the various implementations described above can be combined to provide further implementations.

Any patents and applications and other references noted above, including any that may be listed in accompanying filing papers, are incorporated herein by reference. Aspects of the technology can be modified, if necessary, to employ the systems, functions, and concepts of the various references described above to provide yet further implementations of the technology.

These and other changes can be made to the invention in light of the above Detailed Description. While the above description describes certain implementations of the technology, and describes the best mode contemplated, no matter how detailed the above appears in text, the invention can be practiced in many ways. Details of the system may vary considerably in its implementation details, while still being encompassed by the technology disclosed herein. As noted above, particular terminology used when describing certain features or aspects of the technology should not be taken to imply that the terminology is being redefined herein to be restricted to any specific characteristics, features, or aspects of the technology with which that terminology is associated. In general, the terms used in the following claims should not be construed to limit the invention to the specific implementations disclosed in the specification, unless the above Detailed Description section explicitly defines such terms. Accordingly, the actual scope of the invention encompasses not only the disclosed implementations, but also all equivalent ways of practicing or implementing the invention under the claims.

While certain aspects of the technology are presented below in certain claim forms, the inventors contemplate the various aspects of the technology in any number of claim forms. For example, while only one aspect of the invention is recited as implemented in a computer-readable medium, other aspects may likewise be implemented in a computer-readable medium. Accordingly, the inventors reserve the right to add additional claims after filing the application to pursue such additional claim forms for other aspects of the technology.

The invention claimed is:

1. At least one computer-readable medium storing instructions that, when executed by a processor in a computing system, cause the computing system to perform a method of registering network functions (NFs) in a Fifth Generation (5G) telecommunications network that includes a domain name system (DNS), the method comprising:
    establishing at least one global network repository function (NRF) and at least one regional NRF for the 5G telecommunications network based on communicating with the DNS;
    instantiating a new NF having a target region;
    based on the instantiation, obtaining a global list at the new NF based on communicating with the DNS, wherein the global list identifies the at least one global NRF;
    obtaining a regional list at the new NF based on communicating with one or more of the global NRFs according to the global list and the target region of the new NF, wherein the regional list identifies the at least one regional NRF;
    dynamically registering the new NF with one or more regional NRFs according to the regional list; and
    obtaining at the new NF a function list based on communicating with the one or more regional NRFs, wherein the function list identifies one or more other NFs associated with the new NF and/or the one or more regional NRFs.

2. The computer-readable medium of claim 1, wherein establishing the at least one global NRF and the at least one regional NRF includes initiating the at least one global NRF and the at least one regional NRF for the 5G telecommunications network.

3. The computer-readable medium of claim 1, wherein establishing the at least one global NRF includes:
    instantiating a new NRF having an identifier;
    receiving at the new NRF a global list from the DNS;
    comparing the global list to an initial configuration that represents a predetermined quantity of global NRFs; and
    based on the comparison, adding the identifier of the new NRF at the DNS as a global NRF.

4. The computer-readable medium of claim 1, wherein establishing the at least one regional NRF includes:
    instantiating a new NRF having an identifier;
    receiving at the new NRF one or more lists from the DNS, the global NRF, or a combination thereof;
    comparing the one or more lists to an initial configuration that represents a predetermined quantity, a regional assignment, or a combination thereof of regional NRFs; and
    based on the comparison, adding the identifier of the new NRF at the at least one global NRF as a regional NRF.

5. The computer-readable medium of claim 1, wherein:
    instantiating the new NF includes:
        monitoring network activities,
        comparing the network activities to a predetermined threshold condition, and
        initiating the new NF based on the comparison; and
    dynamically registering the new NF includes registering the new NF directly in response to the comparison.

6. The computer-readable medium of claim 1, wherein establishing the at least one global NRF includes verifying existence of at least one global NRF based on communicating with the DNS.

7. The computer-readable medium of claim 1, wherein obtaining the global list includes:
    identifying an address for the DNS;
    sending one or more queries to the DNS for the global list; and
    receiving the global list from the DNS.

8. The computer-readable medium of claim 1, wherein obtaining the regional list includes:
    identifying an address for one of the global NRFs based on the global list;
    sending one or more queries to the one of the global NRFs for the regional list corresponding to the target region; and
    receiving the regional list from the one of the global NRFs.

9. The computer-readable medium of claim 1, wherein:
    obtaining the regional list includes a sequence for the regional NRFs associated with the target region; and
    dynamically registering the new NF includes communicating with one or more of the regional NRFs associated with the target region according to the sequence.

10. The computer-readable medium of claim 1, wherein the new NF is at least initially instantiated as a charging function (CHF), a session management function (SMF), and/or a policy control function (PCF).

11. A computing system for registering network functions (NFs) in a Fifth Generation (5G) telecommunications network including at least one domain name system (DNS), the system comprising:
    at least one processor;
    at least one memory operably coupled to the at least one processor and storing computer executable instructions that, when executed by the at least one processor, causes the computing system to:
        establish at least one global network repository function (NRF) and at least one regional NRF for the 5G telecommunications network based on communicating with the DNS;
        instantiate a new network function (NF) associated with a target region;
        based on the instantiation, obtain a global list at the new NF based on communicating with the DNS, where the global list identifies the at least one global NRF;
        obtain a regional list at the new NF based on communication with one or more of the global NRFs according to the global list and the target region of the new NF, wherein the regional list identifies the at least one regional NRF;
        dynamically register the new NF with one or more regional NRFs according to the regional list; and
        obtain, at the new NF, a function list based on communicating with the one or more regional NRFs, wherein the function list identifies one or more other NFs associated with the new NF and/or the one or more regional NRFs.

12. The computing system of claim 11, wherein establishing the at least one global NRF and the at least one regional NRF further causes the computing system to initiate the at least one global NRF and the at least one regional NRF for the 5G telecommunications network.

13. The computing system of claim 11, wherein establishing the at least one global NRF further causes the computing system to:
instantiate a new NRF having an identifier;
receive at the new NRF a global list from the DNS;
compare the global list to an initial configuration that represents a predetermined quantity of global NRFs; and
based on the comparison, add the identifier of the new NRF at the DNS as a global NRF.

14. The computing system of claim 11, wherein establishing the at least one regional NRF further causes the computing system to:
instantiate a new NRF having an identifier;
receive at the new NRF one or more lists from the DNS, the global NRF, or a combination thereof;
compare the one or more lists to an initial configuration that represents a predetermined quantity, a regional assignment, or a combination thereof of regional NRFs; and
based on the comparison, add the identifier of the new NRF at the at least one global NRF as a regional NRF.

15. The computing system of claim 11, wherein:
instantiating the new NF further causes the computing system to:
monitor network activities,
compare the network activities to a predetermined threshold condition, and
initiate the new NF based on the comparison; and
dynamically registering the new NF further causes the computing system to register the new NF directly in response to the comparison.

16. A computer-implemented method of registering network functions (NFs) in a Fifth Generation (5G) telecommunications network that includes a domain name system (DNS), the method comprising:
establishing at least one global network repository function (NRF) and at least one regional NRF for the 5G telecommunications network based on communicating with the DNS;
instantiating a new NF having a target region;
based on the instantiation, obtaining a global list at the new NF based on communicating with the DNS, wherein the global list identifies the at least one global NRF;
obtaining a regional list at the new NF based on communicating with one or more of the global NRFs according to the global list and the target region of the new NF, wherein the regional list identifies the at least one regional NRF;
dynamically registering the new NF with one or more regional NRFs according to the regional list; and
obtaining at the new NF a function list based on communicating with the one or more regional NRFs, wherein the function list identifies one or more other NFs associated with the new NF and/or the one or more regional NRFs.

17. The computer-implemented method of claim 16, wherein establishing the at least one global NRF and the at least one regional NRF includes initiating the at least one global NRF and the at least one regional NRF for the 5G telecommunications network.

18. The computer-implemented method of claim 16, wherein establishing the at least one global NRF includes:
instantiating a new NRF having an identifier;
receiving at the new NRF a global list from the DNS;
comparing the global list to an initial configuration that represents a predetermined quantity of global NRFs; and
based on the comparison, adding the identifier of the new NRF at the DNS as a global NRF.

19. The computer-implemented method of claim 16, wherein establishing the at least one regional NRF includes:
instantiating a new NRF having an identifier;
receiving at the new NRF one or more lists from the DNS, the global NRF, or a combination thereof;
comparing the one or more lists to an initial configuration that represents a predetermined quantity, a regional assignment, or a combination thereof of regional NRFs; and
based on the comparison, adding the identifier of the new NRF at the at least one global NRF as a regional NRF.

20. The computer-implemented method of claim 16, wherein:
instantiating the new NF includes:
monitoring network activities,
comparing the network activities to a predetermined threshold condition, and
initiating the new NF based on the comparison; and
dynamically registering the new NF includes registering the new NF directly in response to the comparison.

* * * * *